(12) United States Patent
Miller et al.

(10) Patent No.: US 9,677,424 B2
(45) Date of Patent: Jun. 13, 2017

(54) GAS TURBINE ENGINE

(71) Applicant: General Electric Company, Schenectady, NY (US)

(72) Inventors: Brandon Wayne Miller, Cincinnati, OH (US); Matthew Timothy Franer, Cincinnati, OH (US); Kyle Robert Snow, Loveland, OH (US)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 14/748,368

(22) Filed: Jun. 24, 2015

(65) Prior Publication Data

US 2016/0376924 A1 Dec. 29, 2016

(51) Int. Cl.

| F01D 25/18 | (2006.01) |
|---|---|
| F02C 7/06 | (2006.01) |
| B01D 45/16 | (2006.01) |
| F01D 15/08 | (2006.01) |
| F04D 29/32 | (2006.01) |
| F01D 25/22 | (2006.01) |
| F01D 5/02 | (2006.01) |

(52) U.S. Cl.
CPC ............. *F01D 25/22* (2013.01); *B01D 45/16* (2013.01); *F01D 5/02* (2013.01); *F01D 15/08* (2013.01); *F01D 25/18* (2013.01); *F02C 7/06* (2013.01); *F04D 29/321* (2013.01); *F05D 2220/32* (2013.01); *F05D 2240/60* (2013.01); *F05D 2260/609* (2013.01); *F05D 2260/98* (2013.01)

(58) Field of Classification Search
CPC ........... F05D 2260/98; F05D 2260/609; F05D 2240/60; F05D 2220/32; F04D 29/321; F02C 7/06; F01D 25/18; F01D 15/08; F01D 5/02; F01D 25/22; B01D 45/16
See application file for complete search history.

(56) References Cited

U.S. PATENT DOCUMENTS

| 3,133,693 A | 5/1964 | Holl |
|---|---|---|
| 3,528,241 A | 9/1970 | Venable et al. |
| 5,114,446 A | 5/1992 | Giersdorf et al. |
| 6,799,112 B1 | 9/2004 | Carter et al. |
| 6,883,303 B1 | 4/2005 | Seda |
| 7,093,418 B2 | 8/2006 | Morris et al. |

(Continued)

FOREIGN PATENT DOCUMENTS

EP 1582703 A2 10/2005

OTHER PUBLICATIONS

European Search Report and Opinion issued in connection with corresponding EP Application No. 16175738.0 on Oct. 24, 2016.

*Primary Examiner* — Dwayne J White
*Assistant Examiner* — Justin Pruitt
(74) *Attorney, Agent, or Firm* — Pamela A. Kachur

(57) ABSTRACT

A gas turbine engine is provided defining a radial direction. The gas turbine engine generally includes a compressor section and a turbine section, the compressor section and turbine section together defining a core air flowpath. The gas turbine engine also includes a sump positioned inward of the core air flowpath along the radial direction. An air pump is positioned inward of the core air flowpath along the radial direction for providing a flow of air from the sump to lower an internal pressure of the sump and reduce a likelihood of lubrication leaking from the sump.

20 Claims, 5 Drawing Sheets

(56) References Cited

U.S. PATENT DOCUMENTS

| | | |
|---|---|---|
| 7,584,619 B2 | 9/2009 | Granitz et al. |
| 7,836,675 B2 | 11/2010 | Corattiyil et al. |
| 8,956,106 B2 | 2/2015 | Fang et al. |
| 2007/0193276 A1* | 8/2007 | Corattiyil .................. F02C 7/06 60/782 |

* cited by examiner

GAS TURBINE ENGINE

FIELD OF THE INVENTION

The present subject matter relates generally to a lubrication system for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the combustion section and is then routed through the exhaust section, e.g., to atmosphere. In particular configurations, the turbine section is mechanically coupled to the compressor section by a shaft extending along an axial direction of the gas turbine engine.

During operation, lubrication is provided to various components of the core engine and/or fan to increase a longevity of such components and remove heat from such components. The lubrication is collected in various sumps. For example, certain gas turbine engines include one or more forward engine sumps positioned inward of a main air flowpath of the core engine and one or more aft engine sumps also positioned inward of the main air flowpath. Scavenge pumps, located outward of the main air flowpath, are included to pump lubrication from the sumps into a tank.

An air pressure surrounding the sumps is maintained relatively high to decrease a likelihood of lubrication leaking from such sumps and posing a potential risk to the engine. For example, compressed air from the compressor section can be introduced to a void surrounding the sumps. Additionally, at least certain gas turbine engines include an eductor for lowering an internal pressure of the sumps by bleeding airflow from the main air flowpath of the core engine into an axial centerline. The airflow bled from the main air flowpath generates an airflow through, and negative pressure within, the axial centerline. The sumps may be in airflow communication through an air-oil separator with the axial centerline, such that at least some air in the sumps is urged into the axial centerline, while centrifuging the oil to sump endwalls for scavenging while lowering a pressure within the sumps.

However, such configuration can be inefficient and/or ineffective. For example, an eductor may not be capable of reducing a pressure within the axial centerline by a desired amount, thus requiring the void surrounding the sumps to be maintained at a relatively high pressure and temperature. Additionally, such a configuration can reduce an amount of thrust of the gas turbine engine by bleeding air from the main air flowpath. Accordingly, a gas turbine engine having one or more features for reducing a pressure in one or more sumps positioned inward of a main air flowpath would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine defining a radial direction is provided. The gas turbine engine includes a compressor section and a turbine section, the compressor section and turbine section together defining a core air flowpath. The gas turbine engine additionally includes a sump positioned inward of the core air flowpath along the radial direction, and an air pump positioned inward of the core air flowpath along the radial direction for providing a flow of air from the sump to at least one of the core air flowpath, a bypass air flowpath, or an ambient location.

In another exemplary embodiment of the present disclosure, a gas turbine engine defining a radial direction is provided. The gas turbine engine includes a compressor section and a turbine section, the compressor section and turbine section together defining a core air flowpath. The gas turbine engine additionally includes a shaft mechanically coupling at least a portion of the compressor section and the turbine section, and a sump positioned inward of the core air flowpath along the radial direction. The gas turbine engine additionally includes an impeller positioned inward of the core air flowpath along the radial direction and driven by the shaft. The impeller is positioned in airflow communication with the sump and with at least one of the core air flowpath, a bypass air flowpath, or an ambient location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
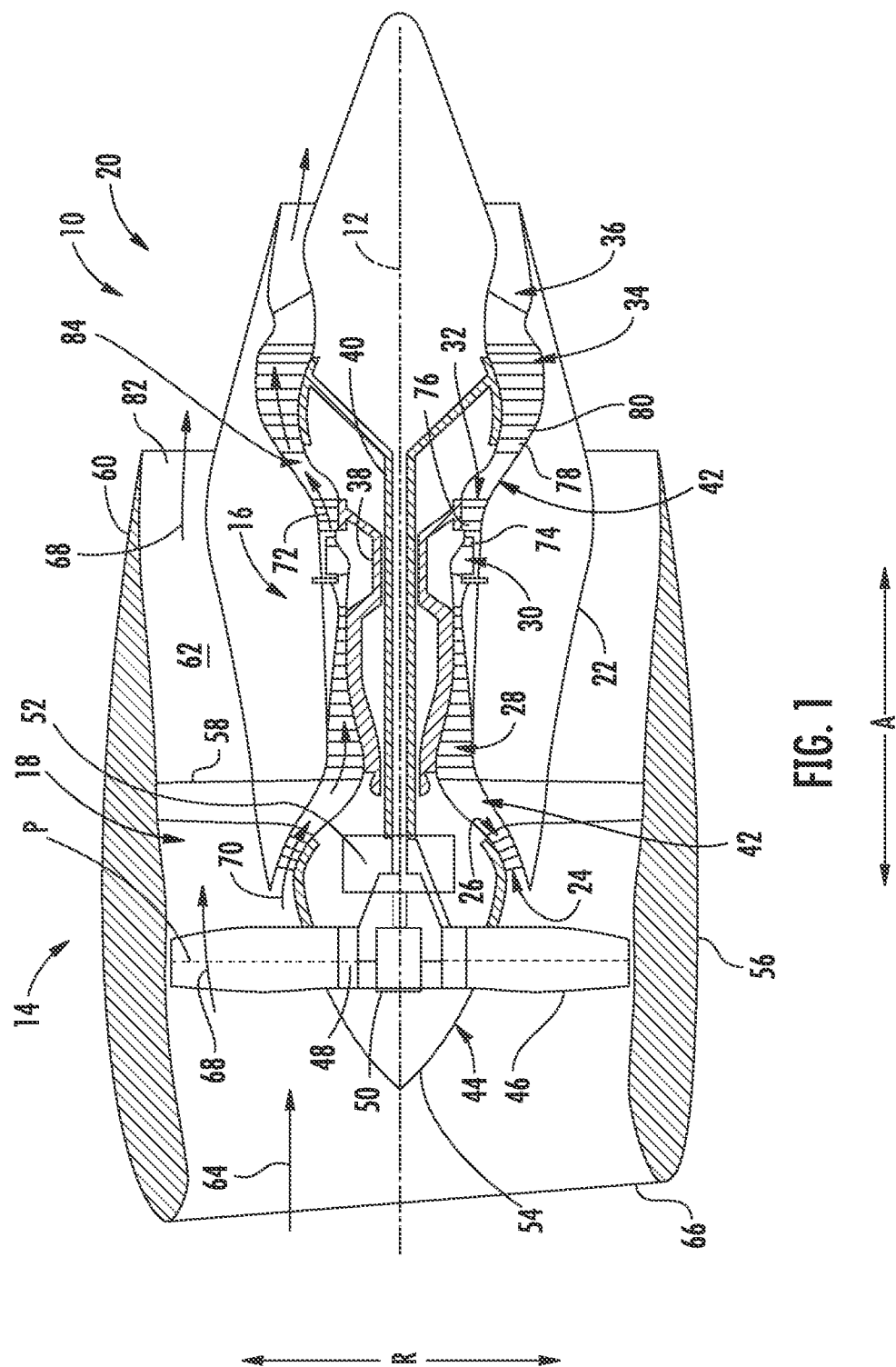
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." However, in other embodiments, aspects of the present disclosure may be incorporated into any other suitable gas turbine engine. For example, in other exemplary embodiments, the gas turbine engine may be an un-ducted turbofan engine, a turboprop engine, and aeroderivative gas turbine engine, etc.

As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted extends generally between a forward end 18 and an aft end 20 along the axial direction A. Additionally, the core turbine engine 16 includes a substantially tubular outer casing or cowl 22 that defines an annular inlet 24 at the forward end 18. The cowl 22 encases, in serial flow relationship, a compressor section including a booster or low pressure (LP) compressor 26 and a high pressure (HP) compressor 28; a combustion section 30; a turbine section including a high pressure (HP) turbine 32 and a low pressure (LP) turbine 34; and a jet exhaust nozzle section 36. A high pressure (HP) shaft or spool 38 drivingly connects the HP turbine 32 to the HP compressor 28. A low pressure (LP) shaft or spool 40 drivingly connects the LP turbine 34 to the LP compressor 26. Additionally, the compressor section, the combustion section 30, turbine section, and jet exhaust nozzle section 36 together define a core air flowpath 42 extending through the core turbine engine 16.

For the embodiment depicted, the fan section 14 includes a variable pitch fan 44 having a plurality of fan blades 46 coupled to a disk 48 in a spaced apart manner. As depicted, the fan blades 46 extend outwardly from disk 48 generally along the radial direction R. Each fan blade 46 is rotatable relative to the disk 48 about a pitch axis P by virtue of the fan blades 46 being operatively coupled to a suitable actuation member 50 configured to collectively vary the pitch of the fan blades 46 in unison. The fan blades 46, disk 48, and actuation member 50 are together rotatable about the longitudinal axis 12 by the LP shaft 40 across a power gear box 52. The power gear box 52 includes a plurality of gears for stepping down the rotational speed of the LP shaft 40 to a more efficient rotational fan speed.

As will be discussed in greater detail below, the exemplary turbofan engine 10 further includes a lubrication system (not shown) configured to provide a lubricant to one or more of the compressor section (including the LP compressor 26 and HP compressor 28), the turbine section (including the HP turbine 32 and the LP turbine 34), the HP shaft 38, the LP shaft 40, the power gear box 52, the actuation member 50, and/or the disk 48. The lubricant may collect in one or more forward and/or aft engine sumps within the core turbine engine 16. Additionally, the lubricant may increase a useful life of such components and/or may remove a certain amount of heat from such components.

Referring still to the exemplary embodiment of FIG. 1, the disk 48 is covered by rotatable front spinner 54 aerodynamically contoured to promote an airflow through the plurality of fan blades 46. Additionally, the exemplary fan section 14 includes an annular fan casing or outer nacelle 56 that circumferentially surrounds the fan 44 and/or at least a portion of the core turbine engine 16. It should be appreciated by those of ordinary skill in the art that the nacelle 56 may be configured to be supported relative to the core turbine engine 16 by a plurality of circumferentially-spaced outlet guide vanes 58. Moreover, a downstream section 60 of the nacelle 56 may extend over an outer portion of the core turbine engine 16 so as to define a bypass airflow passage 62 therebetween.

During operation of the turbofan engine 10, a volume of air 64 enters the turbofan 10 through an associated inlet 66 of the nacelle 56 and/or fan section 14. As the volume of air 64 passes across the fan blades 46, a first portion of the air 64 as indicated by arrows 68 is directed or routed into the bypass airflow passage 62 and a second portion of the air 64 as indicated by arrow 70 is directed or routed into the core air flowpath 42, or more particularly into the LP compressor 26. The ratio between the first portion of air 68 and the second portion of air 70 is commonly known as a bypass ratio. The pressure of the second portion of air 70 is then increased as it is routed through the LP compressor 26, through the HP compressor 28, and into the combustion section 30, where it is mixed with fuel and burned to provide combustion gases 72.

The combustion gases 72 are routed through the HP turbine 32 where a portion of thermal and/or kinetic energy from the combustion gases 72 is extracted via sequential stages of HP turbine stator vanes 74 that are coupled to the cowl 22 and HP turbine rotor blades 76 that are coupled to the HP shaft 38, thus causing the HP shaft 38 to rotate, thereby supporting operation of the HP compressor 28. The combustion gases 72 are then routed through the LP turbine 34 where a second portion of thermal and kinetic energy is extracted from the combustion gases 72 via sequential stages of LP turbine stator vanes 78 that are coupled to the cowl 22 and LP turbine rotor blades 80 that are coupled to the LP shaft 40, thus causing the LP shaft 40 to rotate, thereby supporting operation of the LP compressor 26 and/or rotation of the fan 44.

The combustion gases 72 are subsequently routed through the jet exhaust nozzle section 36 of the core turbine engine 16 to provide propulsive thrust. Simultaneously, the pressure of the first portion of air 68 is substantially increased as the first portion of air 68 is routed through the bypass airflow passage 62 before it is exhausted from a fan nozzle exhaust section 82 of the turbofan 10 also providing propulsive thrust. The HP turbine 32, the LP turbine 34, and the jet exhaust nozzle section 36 at least partially define a hot gas path 84 for routing the combustion gases 72 through the core turbine engine 16.

Figure 2:
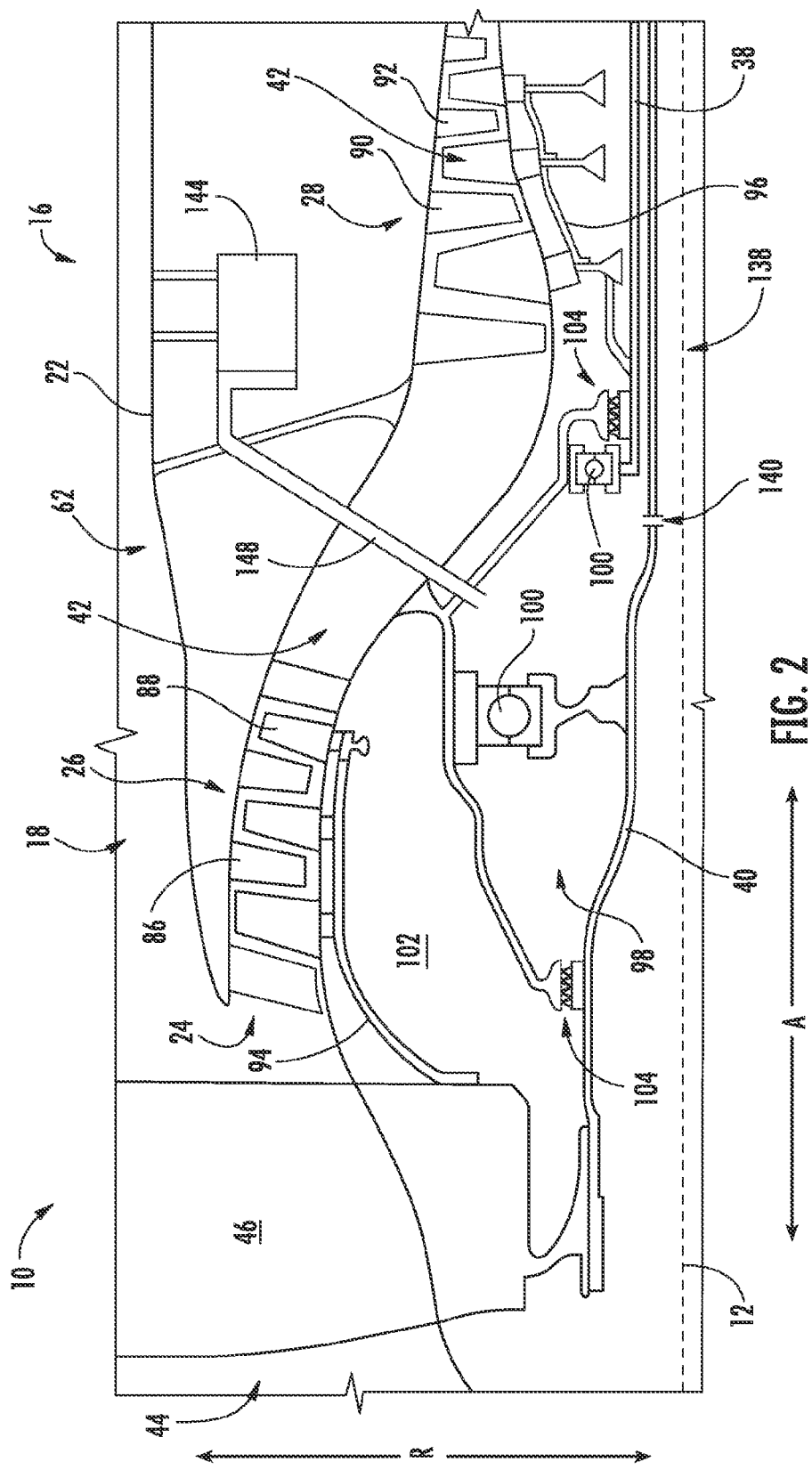
FIG. 2 is a close-up, schematic view of a forward end of the exemplary gas turbine engine of FIG. 1.
Figure 3:
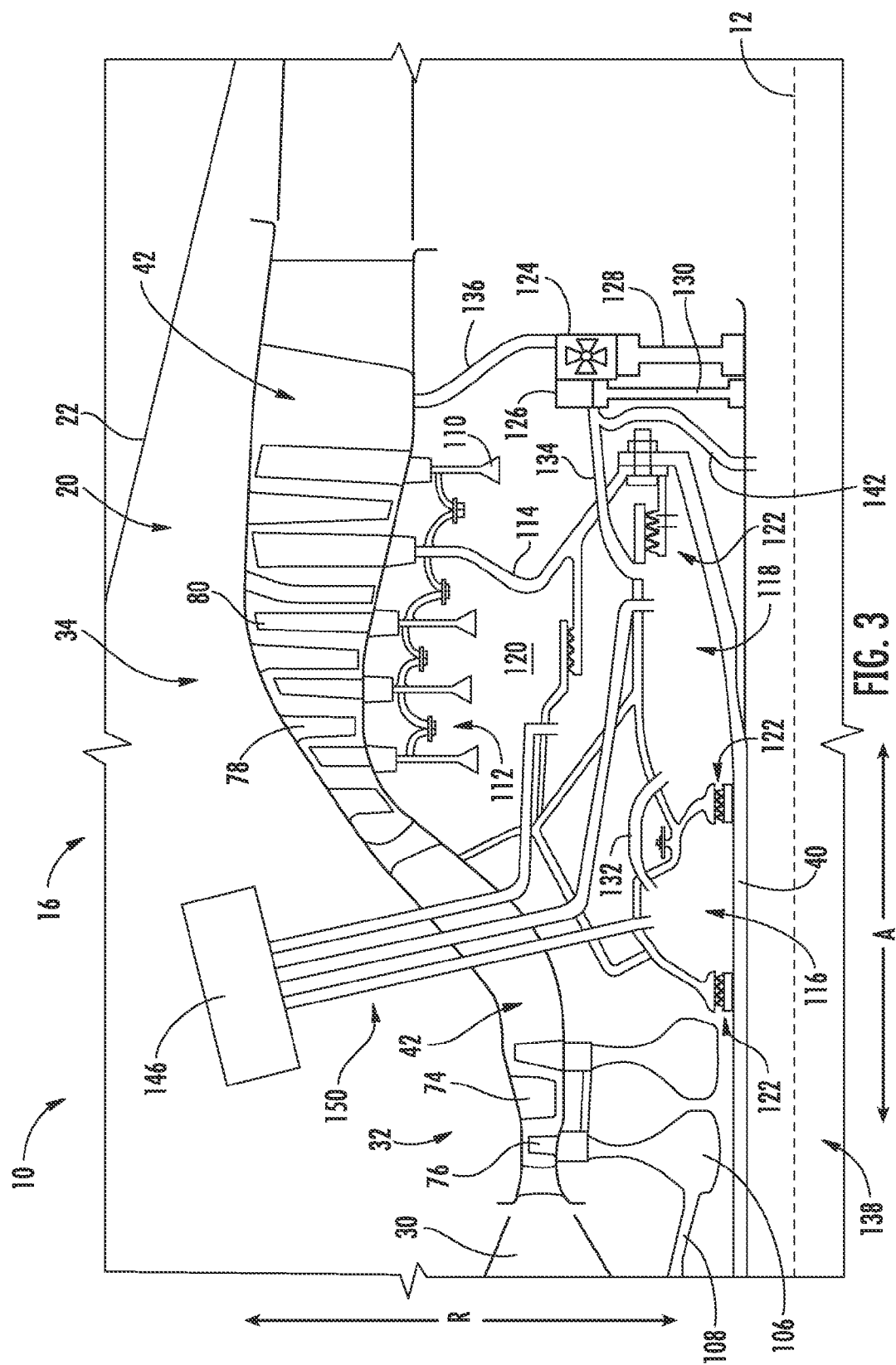
FIG. 3 is a close-up schematic view of an aft end of the exemplary gas turbine engine of FIG. 1.

Referring now to FIGS. 2 and 3, close-up, schematic views of the forward end 18 and aft end 20, respectively, of the core turbine engine 16 of FIG. 1 are provided. More particularly, FIG. 2 provides a schematic view of the compressor section of the core turbine engine 16 of FIG. 1, and FIG. 3 provides a schematic view of the turbine section of the core turbine engine 16 of FIG. 1.

Referring first particularly to FIG. 2, the LP compressor 26 generally includes a plurality of stationary LP compressor stator vanes 86 and rotatable LP rotor blades 88 for compressing the airflow provided through the inlet 24 into the core air flowpath 42. The HP compressor 28 similarly includes a plurality of stationary HP stator vanes 90 and rotatable HP rotor blades 92 for further compressing the airflow provided from the LP compressor 26. Each of the LP compressor rotor blades 88 are connected to the LP shaft 40 through an LP compressor frame structure 94. More particularly, for the embodiment depicted the LP compressor frame structure 94 is attached to the fan 44, which is in turn attached to the LP shaft 40. By contrast, each of the HP compressor rotor blades 92 are connected to the HP shaft 38 through an HP compressor frame structure 96.

The forward end 18 of the core turbine engine 16 also includes a sump, or more particularly, a forward engine sump 98. The forward engine sump 98 is positioned inward of the core air flowpath 42 along the radial direction R and is configured to receive or collect an amount of lubrication. For example, lubrication may be provided to the forward engine sump 98 to increase a longevity of, e.g., bearings 100 and other components positioned in the forward end 18 of the core turbine engine 16. To reduce a risk of lubrication leaking from the forward engine sump 98 into a forward void 102 surrounding the forward engine sump 98, a plurality of seals 104 are provided between, e.g., the various frame structures 94, 96, the LP shaft 40, and the HP shaft 38. Additionally, to further reduce a risk of such lubrication leaking from the forward engine sump 98 into the forward void 102, an air pressure of the forward void 102 is increased relative to an air pressure within the forward engine sump 98. For example, compressed air from the compressor section may be provided to the forward void 102. The compressed air in the forward void 102 may seep through the plurality of seals 104 into the forward engine sump 98, preventing any lubrication within the forward engine sump 98 from seeping in an opposite direction through such seals 104 into the forward void 102.

Referring now particularly to FIG. 3, depicting schematically the turbine section of the core turbine engine 16, the HP turbine 32 is positioned downstream of the combustion section 30 and upstream of the LP turbine 34. As previously stated, the HP turbine 32 includes a plurality of stationary HP turbine stator vanes 74 and a plurality of rotatable HP turbine rotor blades 76. The LP turbine 34 similarly includes a plurality of stationary LP turbine stator vanes 78 a plurality of rotatable LP turbine rotor blades 80. The HP turbine 32 and LP turbine 34 are each configured for extracting additional energy from the combustion gases 72 flowing therethrough.

Each of the HP turbine rotor blades 76 include a weighted base 106 connected to a frame structure 108, with the frame structure 108 being attached to the HP shaft 38 (see FIG. 2). Similarly, each of the LP turbine rotor blades 80 include a weighted base 110. The weighted bases 110 of each of the LP turbine rotor blades 80 are connected to one another via a plurality of arms 112. Additionally, at least one of the LP turbine blades 80 includes an extension 114, which is in turn connected to the LP shaft 40.

The aft end 20 of the core turbine engine 16 additionally includes a first aft engine sump 116 and a second aft engine sump 118, each positioned inward of the core air flowpath 42 along the radial direction R of the turbofan engine 10. The first and second aft engine sumps 116, 118 are each configured for receiving and collecting lubrication. For example, the first and second aft engine sumps 116, 118 may collect lubrication provided to bearings and other components (not shown) positioned therein.

In order to reduce a risk of such lubrication leaking from the respective sumps 116, 118 into an aft void 120 surrounding the sumps 116, 118, a plurality of seals 122 are provided between, e.g., the LP turbine rotor blade extension 114, the LP shaft 40, and various other frame members forming the first and second aft engine sumps 116, 118. Additionally, to further reduce a risk of such lubrication leaking from the first and second aft engine sumps 116, 118 into the aft void 120 surrounding the first and second aft engine sumps 116, 118, an air pressure of the aft void 120 surrounding first and second aft engine sumps 116, 118 is increased relative to an air pressure within the first and second aft engine sumps 116, 118. More particularly, compressed air from, e.g., the compressor section, may be provided into the aft void 120. The compressed air in the aft void 120 area may seep through the plurality of seals 122 into the first and second aft engine sumps 116, 118, preventing any lubrication within the first and second aft engine sumps 116, 118 from seeping through such seals 122 into the aft void 120.

Referring now to both FIGS. 2 and 3, in order to further decrease an internal pressure of the sumps relative to the forward and aft voids 102, 120, an air pump 124 is positioned inward of the core air flowpath 42 along the radial direction R for providing a flow of air from one or more of the sumps to at least one of the core air flowpath 42, a bypass air path, or an ambient location. Specifically, for the embodiment depicted, the air pump 124 is positioned in airflow communication with each of the forward engine sump 98, the first aft engine sump 116, and the second aft engine sump 118. Moreover, the air pump 124 is further in airflow communication with at least one of the core air flowpath 42, a bypass air flowpath, or an ambient location for exhausting air to at least one of the core air flowpath 42, a bypass air flowpath, or an ambient location.

The core turbine engine 16 additionally includes an air-oil separator 126 positioned in the flow of air generated by the air pump 124, upstream of the air pump 124. For the embodiment depicted, the air pump 124 is configured as an impeller, and both the air pump 124 and the air-oil separator 126 are driven by the LP shaft 40. The air-oil separator 126 is configured to remove an amount of lubrication from the airflow provided to the air pump 124 from the various sumps. The lubrication removed by the air-oil separator 126 may be routed back to one or more of the forward engine sump 98, first aft engine sump 116, and/or second aft engine sump 118 by a lubrication conduit (not shown). The air-oil separator 126 may be any form of air-oil separator 126 capable of removing lubrication from an airflow. For example, in certain exemplary embodiments, the air-oil separator 126 may include a rotating baffle or other mesh feature positioned in the airflow provided by the air pump 124 to capture an amount of lubrication therein.

Additionally, the exemplary air pump 124 depicted is driven by the LP shaft 40 through one or more gears 128, and similarly, the air-oil separator 126 is driven by the LP shaft 40 through one or more gears 130. However, in other exemplary embodiments, the air pump 124 and/or the air-oil separator 126 may additionally, or alternatively, be driven by the LP shaft 40 in any other suitable manner. For example, in other exemplary embodiments, the air pump 124 and/or air-oil separator 126 may be driven directly by the LP shaft 40. Additionally, or alternatively, the air pump 124 may be driven by the LP shaft 40 directly or through one or more gears 128 mechanically coupling the air pump 124 to the LP shaft 40, and the air-oil separator 126 may, in turn, be mechanically coupled to the air pump 124.

As stated, the air pump 124 is airflow communication with the plurality of sumps. More particularly, as is depicted in FIG. 3, the first aft engine sump 116, second aft engine sump 118, air-oil separator 126, air pump 124, and core air flowpath 42 are configured in serial flow communication. For example, a jumper tube 132 is provided for fluidly connecting the first and second aft engine sumps 116, 118, such that the first and second aft engine sumps 116, 118 are in airflow communication; a main airflow tube 134 is provided for fluidly connecting the second aft engine sump 118 and the air-oil separator 126, such that the second aft engine sump 118 and air-oil separator 126 are in airflow communication; the air-oil separator 126 is positioned directly adjacent to the air pump 124 (as shown), such that the air-oil separator 126 is in airflow communication with the air pump 124; and an outlet tube 136 is provided for fluidly connecting the air pump 124 to the core air flowpath 42, such that the air pump 124 and the core air flowpath 42 are in airflow communication.

It should be appreciated, however, that in other exemplary embodiments, any other suitable configuration may be provided for positioning such components in airflow communication with one another. For example, in other exemplary embodiments, one or more additional tubes may be provided for fluidly connecting the air-oil separator 126 and the air pump 124. Additionally, in other embodiments, at least certain of the sumps may be in direct airflow communication with one another. For example, an opening may be defined in a wall shared between the first aft engine sump 116 and second aft engine sump 118 such that the first and second aft engine sumps 116, 118 are in direct airflow communication. Moreover, in still other embodiments, the air pump 124 may be in fluid communication with any other portion of the core air flowpath 42, or alternatively may be in fluid communication with a bypass air flowpath or, any suitable ambient position. For example, in other exemplary embodiments, the air pump 124 may be configured to exhaust to the exhaust section of the core turbine engine 16, or may be ducted through the core air flowpath 42 to, e.g., the bypass airflow passage 62, a bypass air flowpath, or to ambient.

Moreover, for the exemplary embodiment depicted, the air pump 124 is further in airflow communication with the forward engine sump 98 through an axial centerline 138 of the core turbine engine 16. More particularly, for the embodiment depicted, an opening 140 is defined in the LP shaft 40 to allow an airflow from the forward engine sump 98 into the axial centerline 138 of the core turbine engine 16. Further, a secondary airflow tube 142 is provided for fluidly connecting the axial centerline 138 and the air-oil separator 126, such that the axial centerline 138 is in airflow communication with the air pump 124 (via the air-oil separator 126). Specifically, for the embodiment depicted, the core turbine engine 16 is configured such that the forward engine sump 98, the axial centerline 138, the secondary airflow tube 142, the air-oil separator 126, the air pump 124, the outlet tube 136, and the core air flowpath 42 are all in serial airflow communication. Although not depicted, in certain embodiments, an additional air-oil separator may be positioned in the opening 140. Moreover, in other exemplary embodiments, the forward engine sump 98 may be in airflow communication with the air pump 124 via the first and/or second aft engine sumps. For example, in other exemplary embodiments, the LP shaft 40 may include one or more openings into one or both of the first and second aft engine sumps such that a respective one of the first and second aft engine sumps is in airflow communication with the axial centerline 138.

An air pump in accordance with such an exemplary embodiment may efficiently reduce an air pressure within the engine sumps to reduce a likelihood of any lubrication positioned therein leaking through, e.g., one or more seals into a void area of the compressor section or the turbine section. Additionally, an air pump in accordance with such an exemplary embodiment may efficiently reduce an air pressure within the engine sumps without necessitating bleeding an airflow from the core air flowpath into an axial centerline of the core turbine engine. Further, given the increased efficiency of the air pump in reducing a pressure within the engine sumps, inclusion of an air pump in accordance with an exemplary embodiment of the present disclosure may allow for voids surrounding the engine sumps to be maintained at a lower pressure and a lower temperature.

Referring still to FIGS. 2 and 3, the core turbine engine 16 additionally includes a forward scavenge pump 144 (FIG. 2) and an aft scavenge pump 146 (FIG. 3), each positioned in an under-cowl area located outward of the core air flowpath 42 along the radial direction R. The forward scavenge pump 144 is positioned proximate the forward end 18 of the core turbine engine 16 in the compressor section, and the aft scavenge pump 146 is positioned proximate the aft end 20 of the core turbine engine 16 in the turbine section. It should be appreciated, however, that the forward scavenge pump 144 and aft scavenge pump 146 may in other exemplary embodiments be positioned in any other suitable location. Additionally, the forward and/or aft scavenge pumps 144, 146 may each include a plurality of scavenge pumps. Alternatively, the core turbine engine 16 may instead only include a single scavenge pump positioned at any suitable location.

A plurality of scavenge lines fluidly connect the forward and aft scavenge pumps 144, 146 to the plurality of sumps. More particularly, a forward scavenge line 148 fluidly connects the forward scavenge pump 144 to the forward engine sump 98 (FIG. 2), and a plurality of aft scavenge lines 150 fluidly connect the aft scavenge pump 146 to the first aft engine sump 116 and the second aft engine sump 118. As depicted, the forward scavenge line 148 extends from the forward scavenge pump 144 through the core air flowpath 42 to the forward engine sump 98, and the plurality of aft scavenge lines 150 extend from the aft scavenge pump 146 through the core air flowpath 42 to the first and second aft engine sumps 116, 118. One or more struts or other structural members (not shown) may be included to encase the forward and aft scavenge lines 148, 150 extending through the core air flowpath 42.

Notably, as discussed above the voids surrounding the engine sumps may be maintained at lower temperatures and pressures due to the inclusion of an air pump in accordance with the present disclosure. Thus, the scavenge lines and any struts or other structural members encasing the scavenge lines may have a reduced cross-sectional size, and therefore a reduced aerodynamic impact on an airflow through the core air flowpath. In this manner, inclusion of an air pump in accordance with the present disclosure may further increase an efficiency of the turbofan engine.

It should be appreciated, however, that the exemplary embodiment of FIGS. 2 and 3 is provided by way of example only. For example, in other exemplary embodiments, the air pump 124 may be positioned inward of the core air flowpath 42 at any suitable location within the core turbine engine 16. For example, in certain exemplary embodiments, the air pump 124 may be positioned forward of the aft engine sump 98 (see FIG. 4), and/or may be driven directly or indirectly by the HP shaft 38 (see FIG. 5).

Figure 4:
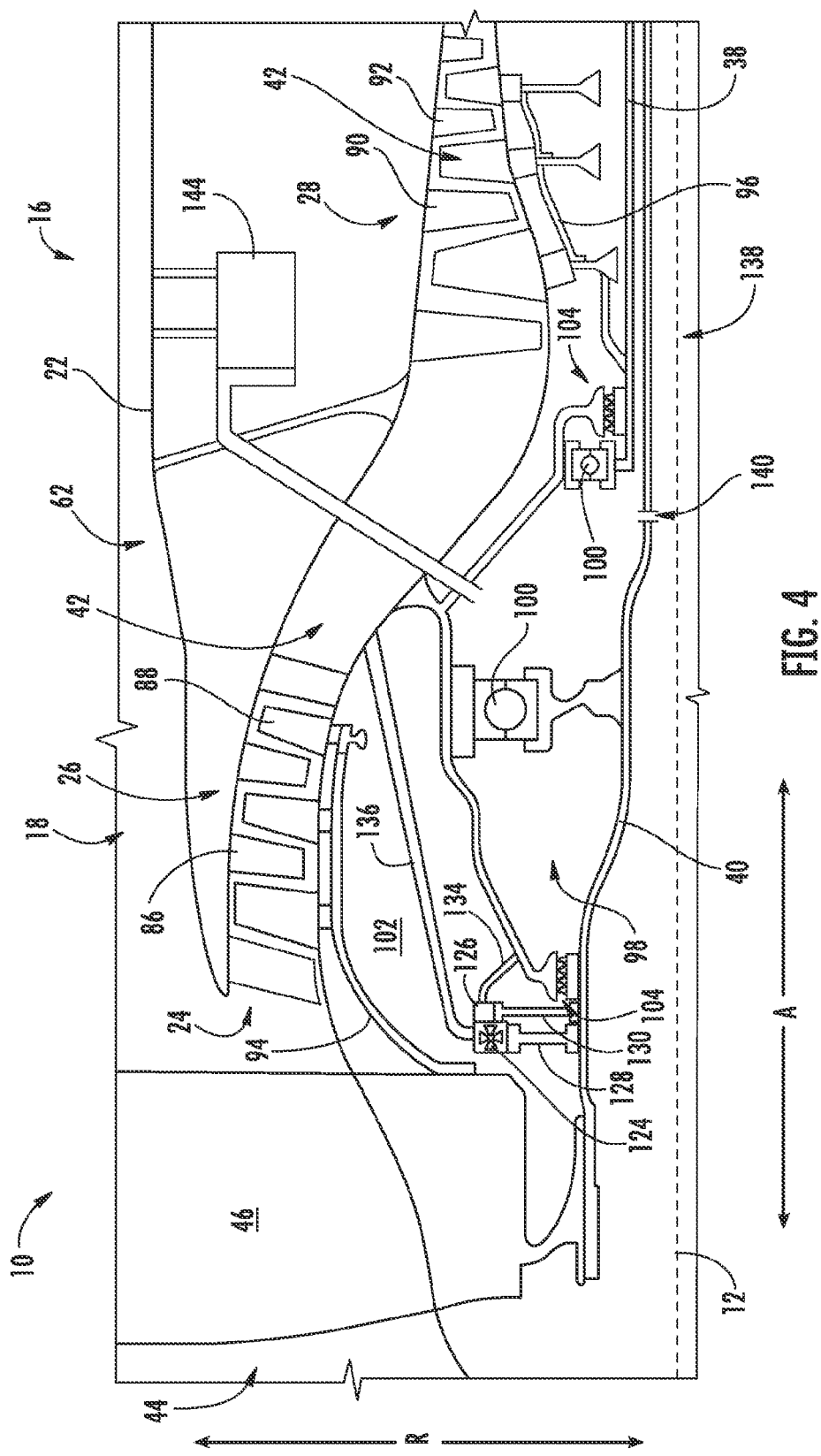
FIG. 4 is a close-up, schematic view of a forward end of a gas turbine engine in accordance with another exemplary embodiment of the present disclosure.

Specifically, referring now to FIG. 4, a close-up, schematic view is provided of a forward end 18 of a core turbine engine 16 in accordance with another exemplary embodiment of the present disclosure. For the exemplary embodiment of FIG. 4, an air pump 124 is positioned forward of a forward engine sump 98, mechanically coupled to the LP shaft 40, such that the air pump 124 is driven by the LP shaft 40. The air pump 124 of FIG. 4 is configured for providing a flow of air from a plurality of sumps, including the forward engine sump 98, to at least one of a core air flowpath 42, a bypass air flowpath, or an ambient location.

Further, for the embodiment of FIG. 4, an air-oil separator 126 is provided in the flow of air provided by the air pump 124, upstream of the air pump 124. A main airflow tube 134 extends from the air-oil separator 126 to the forward engine sump 98 fluidly connecting the air-oil separator 126 and the forward engine sump 98, such that the air-oil separator 126 (and air pump 124) is in airflow communication with the forward engine sump 98. Additionally, an outlet tube 136 fluidly connects the air pump 124 and core air flowpath 42 such that the air pump 124 is in airflow communication with the core air flowpath 42 at a location downstream of the LP compressor 26 and upstream of the HP compressor. In other embodiments, however, the air pump 124 may instead be in airflow communication with any other suitable location of the core air flowpath 42, a bypass air flowpath, or an ambient location via the outlet tube 136.

Notably, the air pump 124 of the exemplary embodiment of FIG. 4 may further be in airflow communication with one or more aft engine sumps via the axial centerline 138. More particularly, as shown, the LP shaft 40 includes an opening 140 such that the forward engine sump 98 is in airflow communication with the axial centerline 138. With such an embodiment, the LP shaft 40 may further include similar openings in the aft end 20, such that the one or more aft engine sumps are also in airflow communication with the axial centerline 138. Thus, in certain exemplary embodiments, the one or more aft engine sumps, the axial centerline 138, the forward engine sump 98, the air-oil separator 126, the air pump 124, and the core air flowpath 42 may each be in serial airflow communication. In other exemplary embodiments, however, the air pump 124 may be in airflow communication with the axial centerline 138 directly via a secondary airflow tube.

Figure 5:
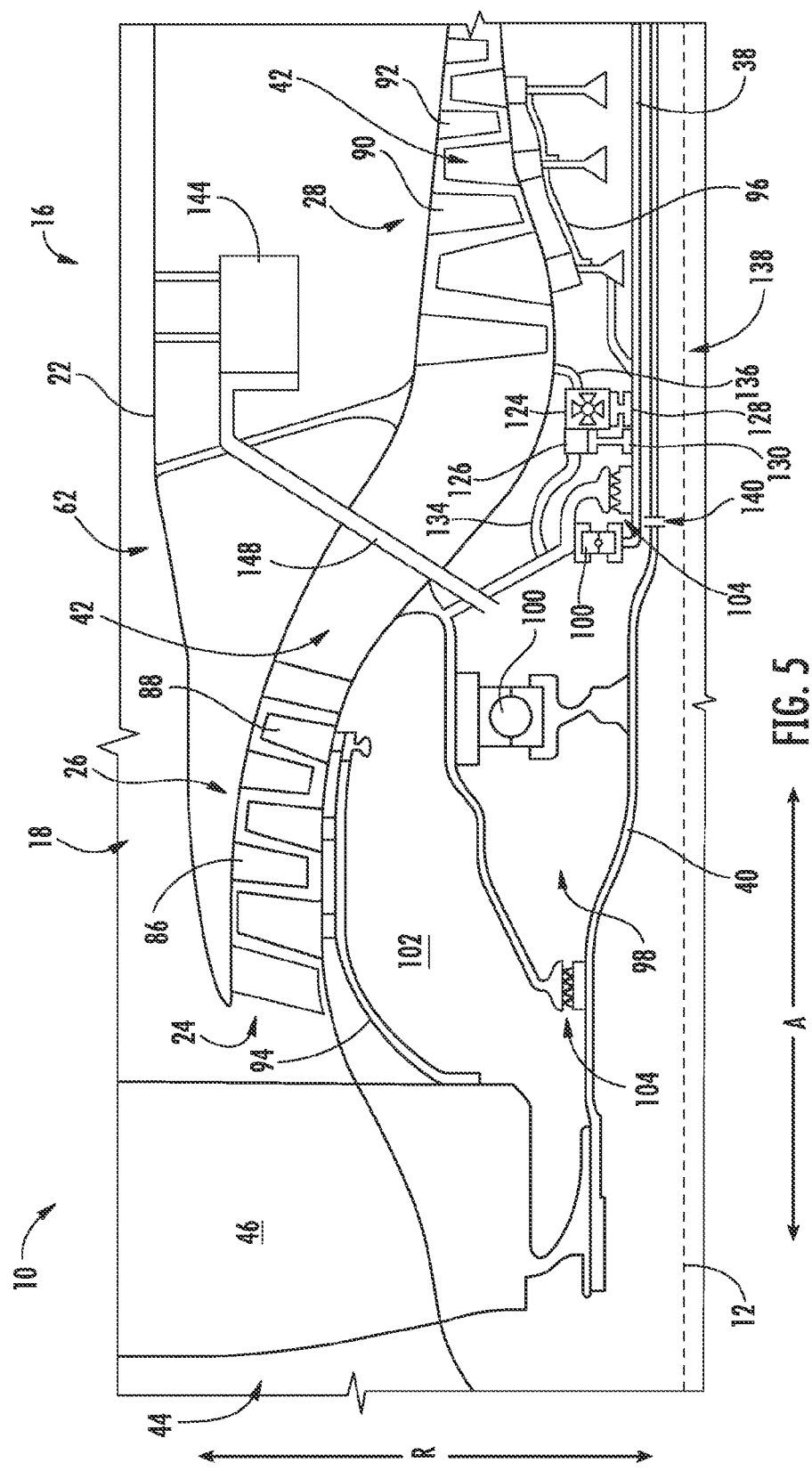
FIG. 5 is a close-up, schematic view of a forward end of a gas turbine engine in accordance with yet another exemplary embodiment of the present disclosure.

Additionally, referring now to FIG. 5, a close-up, schematic view is provided of a forward end 18 of a core turbine engine 16 in accordance with yet another exemplary embodiment of the present disclosure. For the exemplary embodiment of FIG. 5, an air pump 124 and an air-oil separator 126 are positioned forward of a forward engine sump 98, and mechanically coupled to the HP shaft 38, such that the air pump 124 and air-oil separator 126 are driven by the HP shaft 38. The air pump 124 and air-oil separator 126 of FIG. 5 are otherwise configured in substantially the same manner as the exemplary air pump 124 and air-oil separator 126 depicted in FIG. 4 and described above. Notably, however, by mechanically coupling the air pump 124 and air-oil separator 126 to the HP shaft 38, an increased rotational speed for the air pump 124 and air-oil separator 126 may be achieved.

It should be appreciated, however, that in still other exemplary embodiments, any other suitable configuration may be provided. For example, in other exemplary embodiments, the turbofan engine 10 may include a forward air pump positioned in the forward end 18 of the core turbine engine 16 (see FIG. 4), as well as an aft air pump positioned in the aft end 20 of the core turbine engine 16 (see FIG. 3). It should also be appreciated that aspects of the present disclosure may be incorporated into any other suitable gas turbine engine. For example, in other exemplary embodiments, the gas turbine engine may include any other suitable number or configuration of forward engine sumps and/or aft engine sumps, and additionally may include sumps not described or depicted herein. For example, in other embodiments, the gas turbine engine may include an accessory gear box sump, a power gear box sump, or any other additional sumps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction, the gas turbine engine comprising:
a compressor section;
a turbine section, the compressor section and turbine section together defining a core air flowpath;
a sump positioned inward of the core air flowpath along the radial direction; and
an air pump positioned inward of the core air flowpath along the radial direction for providing a flow of air from the sump to at least one of the core air flowpath, a bypass air flowpath, or an ambient location.

2. The gas turbine engine of claim 1, further comprising a shaft mechanically coupling at least a portion of the compressor section and at least a portion the turbine section, the air pump driven by the shaft.

3. The gas turbine engine of claim 1, wherein the air pump is an impeller.

4. The gas turbine engine of claim 1, further comprising an air-oil separator positioned in the flow of air generated by the air pump upstream of the air pump.

5. The gas turbine engine of claim 4, further comprising a shaft mechanically coupling at least a portion of the compressor section and at least a portion the turbine section, the air pump and the air-oil separator each driven by the shaft.

6. The gas turbine engine of claim 1, wherein the sump is a forward engine sump of the gas turbine engine.

7. The gas turbine engine of claim 1, wherein the sump is an aft engine sump of the gas turbine engine.

8. The gas turbine engine of claim 7, wherein the air pump is positioned proximate to the aft engine sump, and wherein the gas turbine engine further comprises
a forward engine sump in airflow communication with the air pump through an axial centerline of the gas turbine engine.

9. The gas turbine engine of claim 1, wherein the sump is a first aft engine sump, and wherein the gas turbine engine further comprises
a second aft engine sump, wherein the first aft engine sump is in airflow communication with the second aft engine sump, and wherein the second aft engine sump is in airflow communication with the air pump.

10. The gas turbine engine of claim 1, wherein the compressor section comprises a high pressure compressor, wherein the turbine section comprises a high pressure turbine, wherein the high pressure compressor is drivingly connected to the high pressure turbine by a high pressure shaft, and wherein the air pump is driven by the high pressure shaft.

11. The gas turbine engine of claim 1, wherein the compressor section comprises a low pressure compressor, wherein the turbine section comprises a low pressure turbine, wherein the low pressure compressor is drivingly connected to the low pressure turbine by a low pressure shaft, and wherein the air pump is driven by the low pressure shaft.

12. A gas turbine engine defining a radial direction, the gas turbine engine comprising:
   a compressor section;
   a turbine section, the compressor section and turbine section together defining a core air flowpath;
   a shaft mechanically coupling at least a portion of the compressor section and the turbine section;
   a sump positioned inward of the core air flowpath along the radial direction; and
   an impeller positioned inward of the core air flowpath along the radial direction and driven by the shaft, the impeller positioned in airflow communication with the sump and with at least one of the core air flowpath, a bypass air flowpath, or an ambient location.

13. The gas turbine engine of claim 12, wherein the impeller is configured for generating an airflow from the sump to at least one of the core air flowpath or the ambient location, and wherein the gas turbine engine further comprises
   an air-oil separator positioned in the flow of air generated by the impeller upstream of the impeller.

14. The gas turbine engine of claim 13, wherein the impeller and the air-oil separator are each driven by the shaft.

15. The gas turbine engine of claim 12, wherein the sump is a forward engine sump of the gas turbine engine.

16. The gas turbine engine of claim 12, wherein the sump is an aft engine sump of the gas turbine engine.

17. The gas turbine engine of claim 16, further comprising:
   a forward engine sump in airflow communication with the impeller through the shaft of the gas turbine engine.

18. The gas turbine engine of claim 12, wherein the sump is a first aft engine sump, and wherein the gas turbine engine further comprises
   a second aft engine sump, wherein the first aft engine sump is in airflow communication with the second aft engine sump, and wherein the second aft engine sump is in airflow communication with the impeller.

19. The gas turbine engine of claim 12, further comprising
   a scavenge pump positioned outward of the core air flowpath along the radial direction; and
   a scavenge line fluidly connecting the sump and the scavenge pump.

20. The gas turbine engine of claim 12, wherein the compressor section comprises a low pressure compressor, wherein the turbine section comprises a low pressure turbine, wherein the shaft is a low pressure shaft drivingly connecting the low pressure compressor and the low pressure turbine, and wherein the impeller is driven by the low pressure shaft.

* * * * *